Nov. 5, 1946.   H. C. VAN AUKEN ET AL   2,410,468
BOMB SIGHT
Filed April 9, 1941   5 Sheets-Sheet 2
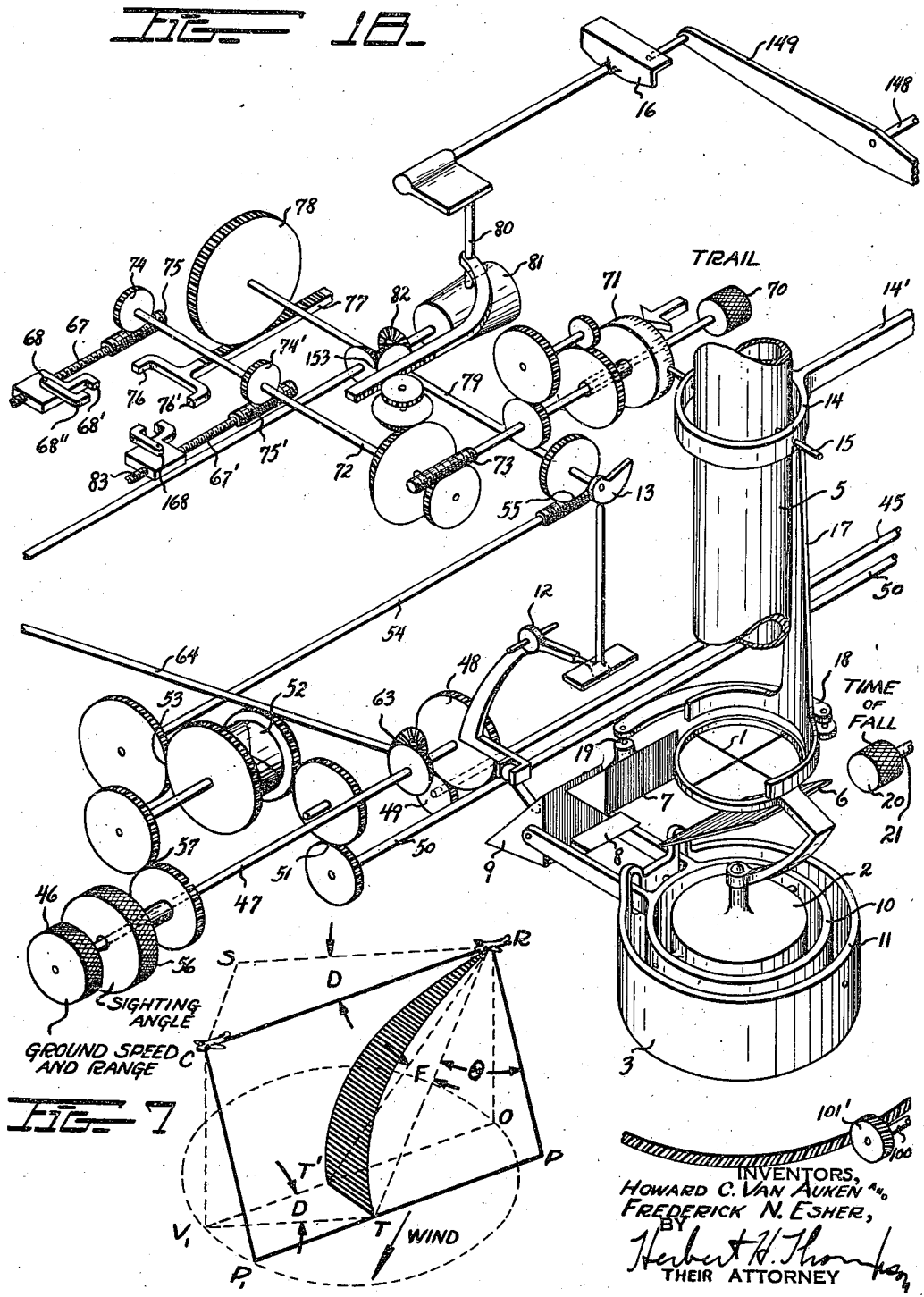
INVENTORS,
HOWARD C. VAN AUKEN AND
FREDERICK N. ESHER,
BY
THEIR ATTORNEY

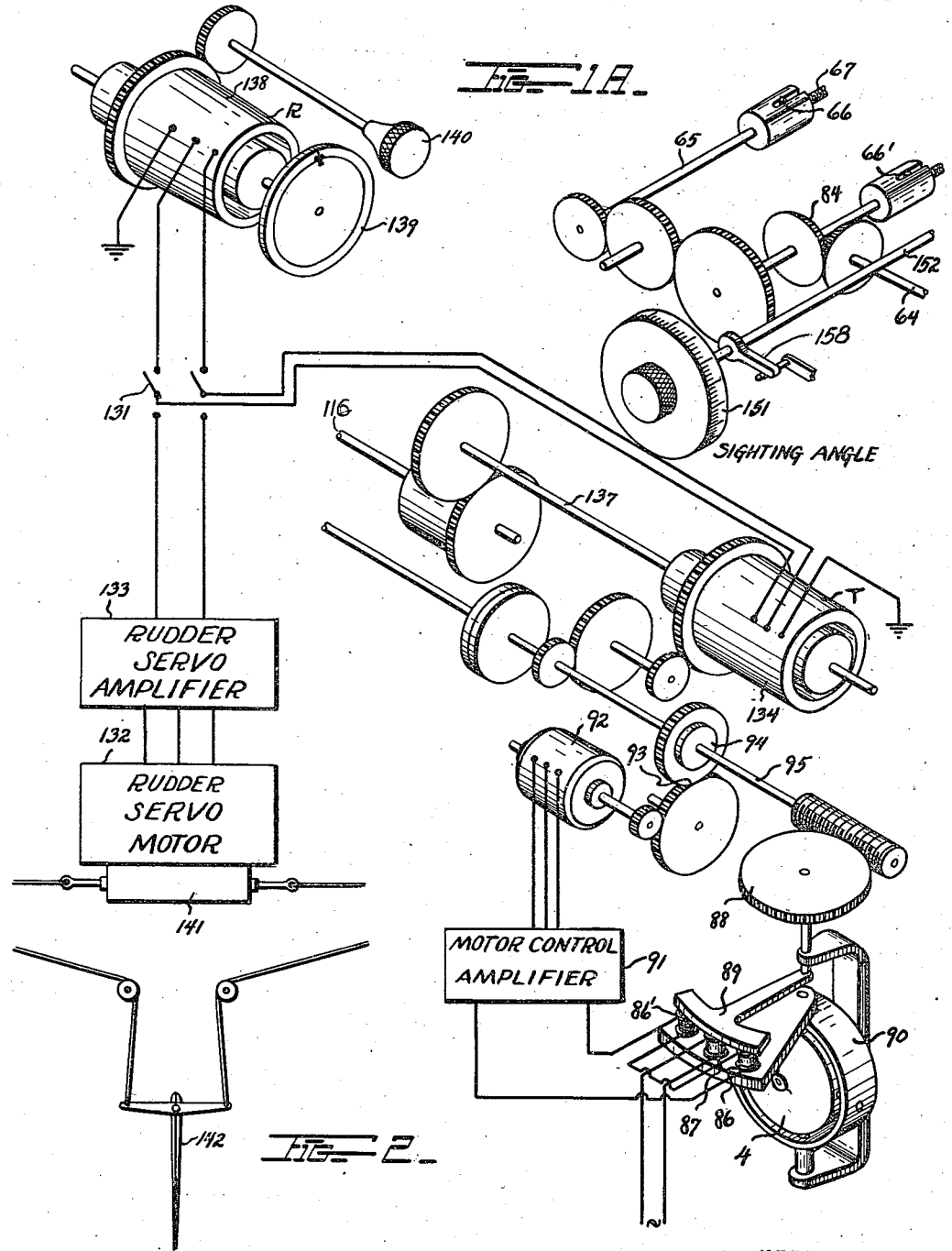

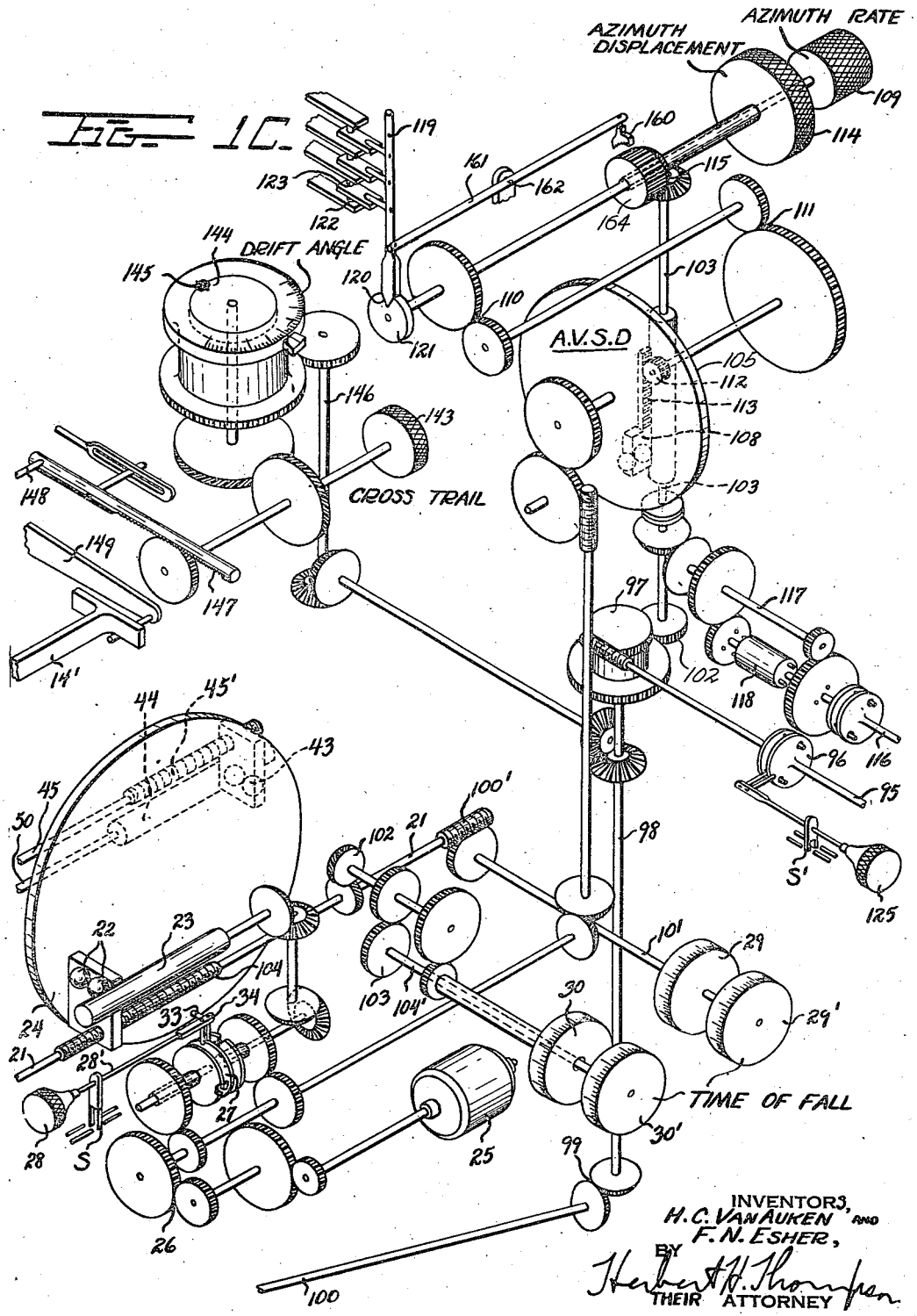

FIG. 3

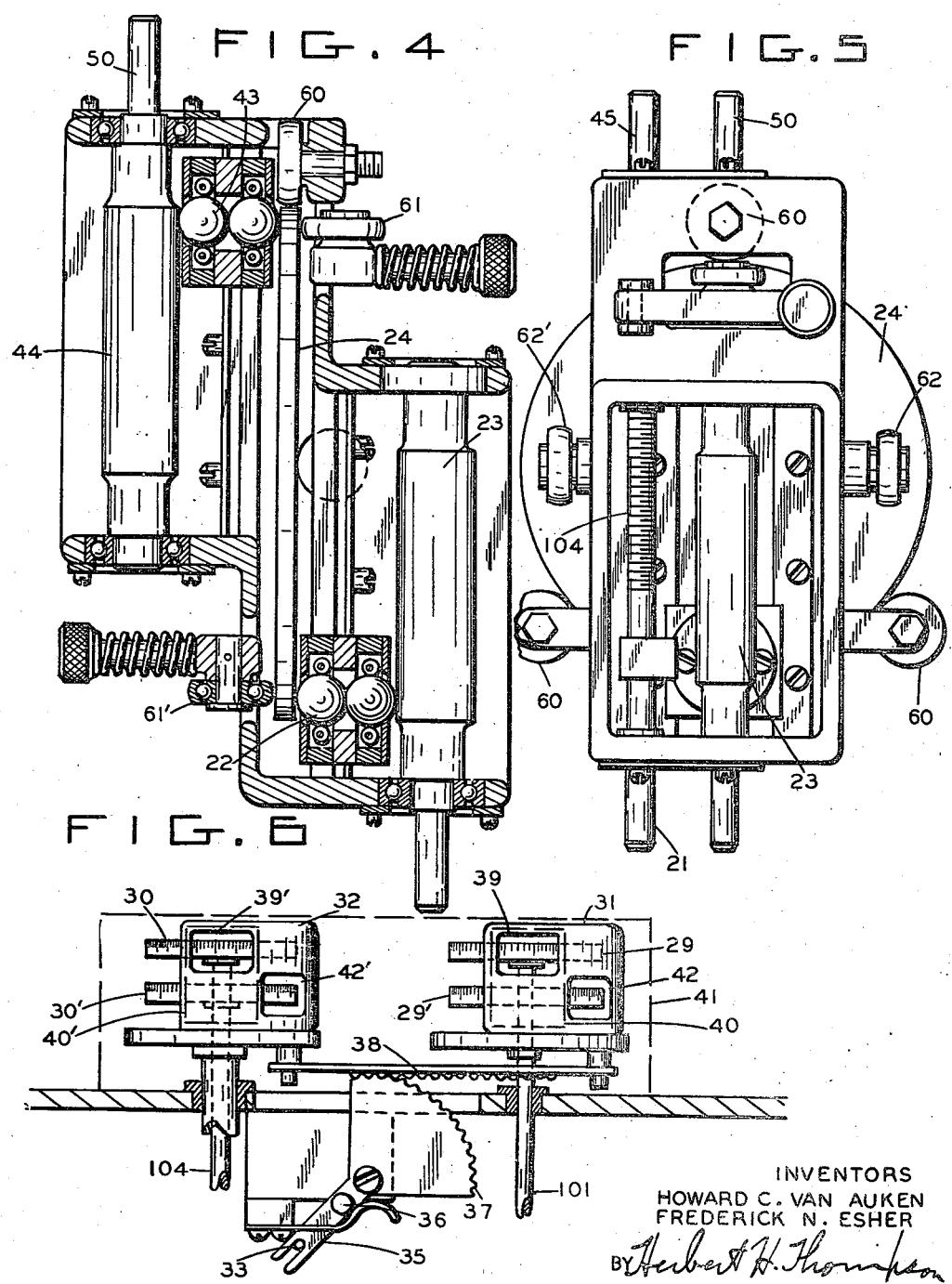

Patented Nov. 5, 1946

2,410,468

UNITED STATES PATENT OFFICE 2,410,468

BOMB SIGHT

Howard C. Van Auken, Bloomfield, and Frederick N. Esher, Rutherford, N. J., assignors to Sperry Gyroscope Company, Inc., Brooklyn, N. Y., a corporation of New York Application April 9, 1941, Serial No. 387,574

6 Claims. (Cl. 244—76)

This invention relates to improvements in the art of bomb sights for aircraft which are designed to direct the course of the craft so that its ground tracks, except for offset, would pass through the target in a straight line and which determine the exact point at which the bombs should be dropped to strike the target. This mechanism also preferably computes and sets in automatically the amount of offset necessary to compensate for side drift due to side winds.

The general principles of such sights are well understood in the art and this invention constitutes improvements in certain elements thereof, whereby simplification is secured as well as improved operation. More particularly, our invention constitutes improvements in the method of obtaining $$\left(\frac{1}{T}\right)$$

in the type of sight shown in the prior patent to E. W. Chafee and H. C. Van Auken (one of the present joint inventors), No. 2,162,699, dated June 20, 1939, for Bomb sights.

Another improvement consists in further development of plural scale sights designed to operate efficiently at more than one altitude range, such as shown in the prior application of H. C. Van Auken and G. N. Hanson, filed January 25, 1941, Serial No. 375,900.

Another improvement consists in the tie-in between the azimuth gyro, automatic pilot and bomb sight, whereby the same directional gyroscope in the automatic pilot may be utilized both for steering the craft and for stabilizing the optics in azimuth.

Referring to the drawings illustrating our invention in diagrammatic form,

Figs. 1A, 1B and 1C are a diagrammatic perspective layout of the elements of the invention, in which the three figures taken together represent a complete diagram.

Fig. 2 is a similar diagram illustrating the automatic pilot portion of the invention with its connections to the bomb sight.

Fig. 3 is a wiring diagram illustrating the principal electric connections involved, in simplified form.

Fig. 4 is a sectional view, on a larger scale, of the special dual variable speed device for introducing $$\left(\frac{1}{T}\right)$$

into the mechanism, both for low altitude and high altitude bombing.

Fig. 5 is a plan view of the same.

Fig. 6 is a side elevation of the two-scale time of flight dials which are shifted from one position to the other for low altitude and for high altitude bombing.

Fig. 7 is a diagram illustrating the trigonometry of bombing.

The optics of the present invention are substantially the same as shown in the aforesaid prior application Ser. No. 375,900. According to this system, the reticle 1 of the system (Fig. 1B) is stabilized in all planes by being mounted on the top of a suitable form of gyro-vertical 2 which, in turn, is mounted on a platform 3 stabilized in azimuth by remote control from a directional gyro 4 (Fig. 2). The line of sight, after passing downwardly through the telescopic sight 5 and through the reticle, is reflected by a mirror 6, thence by a prism 7 to a prism 8, and thence to a target following prism 9. The latter is shown as pivoted on the gimbal ring 10 of the gyro-vertical so as to be stabilized about fore and aft trunnion axis 11, and it is tilted through the angle $\theta$ to follow the target by means of a bell-crank lever 12 which is moved from the sight angle cam 13. The prism 7, on the other hand, is turned around a vertical axis to impart the offset angle F to the line of sight by means similar to that shown in the aforesaid prior application and comprising, briefly, a long bell-crank lever 14 pivoted on axis 15 and having its horizontal arm 14' adjusted up and down by the cross trail mechanism 16 to swing the vertical arm 17 about the pivot 15 and thereby rotate the curved lever 18 and turn the shaft 19 to which prism 7 is secured, as explained in the aforesaid application.

The time of fall is preferably set into the mechanism by adjusting the time of fall fine and coarse dials 29 and 30 (Fig. 1C) from charts prepared in accordance with variable bomb characteristics and altitude. A knob 20 is used to set in this time, said knob rotating a shaft 21 which rotates fine dials 29 through worm and worm wheel 100' and shaft 101, and rotates coarse dial 30 through screw gears 102, reduction gearing 103 and shaft 104'. Shaft 21 also has a thread 104 thereon, threaded in a ball carriage 22 between a cylinder 23 and a disc 24, thereby moving the carriage radially to and from the center of the disc. The cylinder 23 is normally rotated at a constant speed from a motor 25 through a suitable gear train 26 and a change speed gear 27 controlled by push knob 28. In one position of the knob, the cylinder is driven at a relatively slow speed from the motor 25 for high altitude bombing, and in the other position at a higher or multiple speed for relatively low altitude bombing, so that by shifting from one position to the other, the range scale of the machine is shifted. In either position of knob 28, therefore, it will be seen that the disc 24 will be driven from the motor 25 at a rate dependent upon the radial position of the ball carriage 22 over the disc, as determined by the time of fall setting of dials 29 and 30 through knob 20.

Preferably, two dials are provided for both coarse and fine readings 30—30' and 29—29', one pair 30—29 being read when the device is adjusted for the high altitude range and the other 30'—29' for the low altitude range by the knob 28. In order that the proper dials only may be visible at one time, we have shown a connection from the knob 28 to masks 31 and 32 on the two sets of dials. Said connection is shown in the form of a pin 33 on the back of a clutch shifting fork 34 on the shaft 28' of knob 28 which pin engages a slotted arm 35 pivoted at 36 (Fig. 6) and carrying at its upper end a gear sector 37 meshing with an annular rack bar 38. Said bar is pivotally connected at each end to the two masks 31 and 32. In the position shown in Fig. 6, only the upper dials 29 and 30 are visible through the rectangular windows 39, 39' in the two masks, which are in this position aligned with the layer rectangular windows 40, 40' in the outer cover 41 of the instrument. When, however, the knob 28 is shoved to the right in Fig. 1C, pushing the pin 33 to the right in Fig. 6, the masks will be rotated to the left, moving the windows 39, 39' out of alignment with the windows 40, 40' and moving the lower windows 42, 42' into alignment with the windows 40, 40', thereby concealing the upper dials 29, 30 and rendering visible the lower dials 29' and 30'. It will be understood that the two sets of dials 29, 29' and 30, 30' are graduated differently for the different altitude ranges.

As stated, as knob 20 is adjusted, it also adjusts the radial position of ball carriage 22 on disc 24, so that the disc 24 will be rotated in inverse proportion to the time of flight (T) or proportional to $$\frac{1}{T}$$

Driven from said disc is a second ball carriage 43 which is also radially positioned over the surface of the disc and drives a cylinder 44 at a variable speed dependent both on $$\frac{1}{T}$$

and the radial distance of the ball carriage 43 from the center of the disc 24 (Figs. 1C, 4 and 5). The radial position of said ball carriage is controlled from shaft 45' threaded in said carriage, which in turn is rotatably adjusted from a ground speed and range setting knob 46 on shaft 47, having a gear 48 thereon meshing with a pinion 49 on shaft 45. The rotation of the cylinder 44 drives a shaft 50 which positions the sight angle cam 13 through train of gears 51, differential 52, gearing 53, shaft 54 and worm and worm gear 55. A direct and quick positioning of the sight angle cam may also be obtained from the knob 56 through gearing 57 and the other arm of the differential 52.

The preferred detailed construction of the variable speed drive is shown in Figs. 4 and 5. The driven disc 24, as shown, has no central shaft but is rotatably guided at its periphery by a plurality of guide rollers 60. Also, on the opposite side from each of the adjustable ball carriages 22 and 43 is positioned a spring pressed roller 61 and 61' so as to maintain the disc firmly against the balls of each ball carriage and firmly against the respective cylinders 23 and 44. Tilting of the disc is prevented by additional rollers 62 and 62' on the bottom thereof and positioned at right angles to the rollers 61 and 61'.

In normal operation, after the sight is placed on the target through knob 56, the ground speed (G. S.) knob 46 is adjusted until the sight is kept continuously on the target. When this is accomplished, the radial position of the ball carriage 43 on the disc represents whole range ($\overline{PP_1}$) (Fig. 7) with reference to the altitude ratio $$\left(\frac{H}{H'}\right)$$

of the machine, the variable speed mechanism solving the equation $$PP_1 = \frac{GS\left(\frac{H}{H'}\right)}{\frac{1}{T}}$$

The adjustment of the knob 46 is therefore transmitted through bevel gears 63 and shaft 64 to rotate the whole range shaft 65 which rotates, through universal coupling 66, the threaded shaft 67. Said shaft 67 is threaded in a bomb release contact device 68 so as to position the same in accordance with the whole range ($\overline{PP_1}$).

The trail correction ($P_1T$) is shown as introduced from a knob 70 having a trail scale 71 thereon which is set in accordance with tables from the known altitude air speed and terminal velocity of the bomb. Said adjustment rotates a shaft 72 through worm and worm wheel 73 and also rotates a spur gear 74 which meshes with a collar 75 rotatably but non-slidably mounted on the shaft 67 and having on its periphery a circular rack. Therefore rotation of the spur gear 74 will move contact block 68 longitudinally independently of the rotation of the screw shaft 67 to introduce the trail correction. A cooperating contact 76 is shown as secured to a rack bar 77 positioned from a gear 78 on the shaft 79 of the range angle cam 13 so that, as the range angle cam rotates, it will finally advance the contact 76 into contact first with the warning contact 68' and then the final bomb release contact 68''.

The setting of the trail mechanism also longitudinally positions a cam pin 80 on a three-dimensional cam 81 which is positioned rotationally in accordance with a function (the tangent) of the range angle $\theta$ and is so laid out that the lift of the pin is proportional to Y cos $\theta$, where Y represents the trail ($P_1T$). Hence the cam is shown as rotated from the shaft 79 and the range angle cam 13 through bevel gears 82. The lift of the pin 80 governs the tilt of the long lever 149 and of the cross trail linkage through cam surface 16 in a manner similar to that disclosed in the aforesaid application No. 375,900, to finally tilt the arm 14' of the bell-crank lever 14 to thereby rotate the prism 7 to introduce the cross trail angle F. As explained in the aforesaid application, the cross trail angle F is proportional to Y cos $\theta$ sin D, where D is the drift angle, and the latter is set into the mechanism by knob 143, which is turned to bring the drift angle indicator 144 into the position indicated by the index 145 driven from a shaft 146, in turn positioned from the shaft 98 which turns the optics in azimuth, away from its normal fore and aft position and which therefore represents the drift angle. Rotation of the knob 143 operates to shift laterally a rack bar 147 which carries the pivot pin 148 of a lever 149.

In order to adapt the machine to be used also at high altitudes, the bar 77 is also provided with an additional contact 76' adapted to engage alternative bomb release contact block 168. Said block is also mounted on a threaded shaft 67' which may also have swiveled therein a circular rack sleeve 75', similar in function to the rack sleeve 75, for introducing the trail from the spur gear 74' on shaft 72. The threaded shaft 67' is shown as rotated through a universal coupling 66' from a shaft 83 also driven from the shaft 64, but at a slower speed than shaft 65, as through direct bevel gear connection 84.

Figure 3:
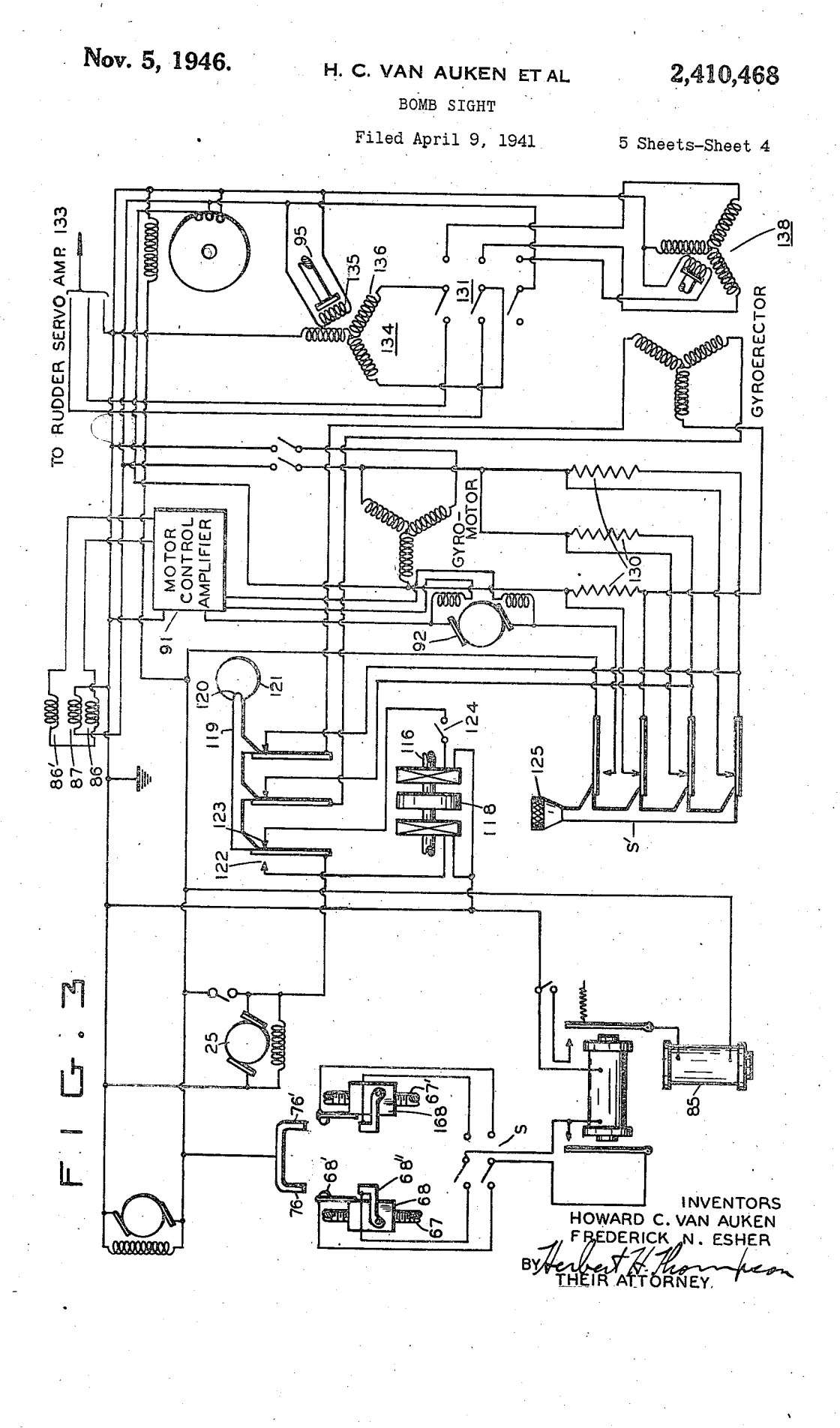

Referring now to the wiring diagram in Fig. 3, it will be seen that when the switch S is rotated counter-clockwise, the contacts on bomb release block 68 will be in control, while when rotated clockwise, release block 168 will be in control to actuate the bomb release solenoids 85. Preferably the switch S is connected to and directly operated from the knob 28 (see Fig. 1C) so that when the scale of the machine is changed by pushing the knob from one position to the other, the switch S is also moved to connect the proper switch block into the circuit with the release solenoid.

As stated above, the optical unit is preferably maintained fixed in azimuth from a suitable directional gyroscope 4 and preferably also the entire aircraft is automatically steered from a directional gyroscope, preferably the same directional gyroscope 4 which serves as a directional reference. A diagrammatic layout for accomplishing this purpose is shown in Fig. 2. The directional gyro 4 is shown as having a two-part inductive pick-off associated therewith, one part having three windings 86, 86' and 87 shown as attached to the vertical ring 90 of the directional gyroscope and the other part being a soft iron bridge 89 attached to the follow-up member 88. Such pick-off is well known in the art and the A. C. signal therefrom is amplified in an amplifier 91 to actuate reversible follow-up motor 92. Said motor is shown as driving, through reduction gears 93 and slip clutch 94, the shaft 95 which drives the follow-up gear 88 on the gyroscope and also runs to the bomb sight, where it is shown as connected through a clutch 96 to one arm of a differential gear train 97 to the vertical shaft 98 driving, through bevel gear 99, a shaft 100 which is shown as turning the base of the gyro-vertical through skew gear 101'. By this means the optics are stabilized in azimuth.

For displacing the optics in azimuth to direct the line of sight on the target and thereby set up the drift angle D, the other arm of the differential 97 is turned from a gear 102 on the shaft 103 of a cylinder 104, forming one element of a variable speed drive AVSD, the disc 105 of which is continuously driven from the motor 25 through a suitable gear train, as shown. The position of the ball carriage 108 may be radially adjusted by means of the azimuth rate knob 109 which turns, through gears 110 and 111, a pinion 112 meshing with rack teeth 113 on carriage 108. By this means the proper rate of turn of the optics may be set up to keep the line of sight on the target. If desired, a direct setting of the optics may be obtained from an auxiliary azimuth displacement knob 114 which turns, through gears 115, the shaft 103 directly, slipping the cylinder under the ball carriage.

At the same time that the optics are turned, we find it preferable also to turn the craft either through the automatic pilot or through the human pilot who observes the pilot director indicator 139. Preferably, a two-speed drive is interposed in these connections so that the craft may either be turned at the same rate as the optics or at a greater rate, which latter is desirable when the correct course is being sought for. To this end, the shaft 103 is shown as driving a shaft 116 leading to the automatic pilot through change speed gearing 117. A three-position clutch 118 controls the variable speed gear. In the central or open position, as indicated in Fig. 3, the shaft 116 stands still, but when pushed to the left in Fig. 1C (up in Fig. 3), the shaft 116 is rotated at one speed, while when pushed to the right in Fig. 1C (down in Fig. 3), shaft 116 is rotated at a multiple speed. The higher ratio is automatically rendered effective when the sight is being uniformly turned at a predetermined rate from the knob 109. When knob 109 is turned, it lifts a switch block 119 out of a notch 120 in a cam 121, thereby closing the back contact 122 (Fig. 3) and thereby exciting a clutch winding (not shown) to draw the armature downwardly in Fig. 3 or to the right in Fig. 1C. The unit ratio, on the other hand, can only be put into operation when the block 119 is in the notch, thus closing front contact 123, and also when a separate switch 124 is closed as shown in Fig. 3. Preferably, also, we interpose an interlock between knobs 109 and 114 so that the latter cannot be moved except when the former is in its zero or inoperative position, i. e., except when switch 119 is in notch 120. For this purpose, we have shown a locking detent 160 on one end of a lever 161 pivoted at 162 and loosely pinned at its opposite end to switch bar 119 so that said detent is pressed into engagement with the teeth on elongated pinion 164 when the bar 119 is raised. The elongated pinion 164 is fixed to gear 115 thereby preventing turning of the knob 114 when a rate of turn is set into the machine through operation of knob 109. As shown in the drawings, the displacement knob 114 may slide with elongated pinion 164 to disconnect the gear 115. This prevents the shaft 103 from becoming locked when detent 160 engages the pinion 164.

The shaft 95 may be entirely disconnected from the optics by pulling a knob 125 to the right in Fig. 1C. This also operates the switch S' for controlling the erection rate of the gyroscope, as more fully explained in the prior application of E. W. Chafee and H. C. Van Auken, Serial No. 128,034, filed February 26, 1937, for Bomb sights, the erecting winding being shown in Fig. 3 at 129 and the resistance controlling the erection rate at 130.

As hereinbefore stated, the sight may be used either with the automatic pilot or without, depending on the position of the switch 131 (Fig. 2. When the switch is in the down position, the rudder servomotor 132 is controlled through amplifier 133 from a signal generator 134 geared to shaft 95. This signal generator is preferably in the form of a Selsyn transmitter (Figs. 2 and 3) in which both the armature and field are rotatable. As shown, the field 135 is rotated from the shaft 95 while the armature 136 is mounted on a shaft 137 rotated from the follow-back shaft 116. When used with the automatic pilot, only the three windings of the field are connected to a Selsyn signal generator (not shown) in the amplifier 133, which gives a signal proportional to the angular displacement of the generator and transmitter. When, however, the switch 131 is in the up position in Figs. 2 and 3, said windings 134 of the field are connected to corresponding windings on the Selsyn repeater motor 138 which operates a pilot directing indicator 139, which may be synchronized with the transmitter by means of a knob 140 operating to adjust the field of said repeater. In Fig. 2, the rudder servomotor 132 is shown in the form of a hydraulic cylinder and piston 141 which operates the rudder 142 of the craft. The sight angle may also be set up directly by a knob 158 and attached scale 151, which rotates a shaft 152 geared directly through bevel gears 153 to the sight angle shaft 79.

From the foregoing it is believed the operation of the bomb sight will be readily apparent. When it is desired to displace the sight quickly to initially find the target, for instance, the knob 114 is turned with the switch 124 open. After the target is sighted and the pilot is desirous of getting on the straight ground track toward the target, the knob 109 is adjusted. Turning of this knob not only sets up the desired rate of turn of the optics, but also throws switch 119 to thereby cause a more rapid turn of the craft through the automatic pilot or pilot director by throwing in the clutch 118, thereby turning the shaft 116 rapidly to displace the field of the transmitter 134 at the desired rate of turn. As the ground track is approached, the azimuth rate is reduced by turning the knob 109 backwardly until it becomes zero when the straight ground track is reached, at which time switch 119 drops into notch 120 and the turn of both the sight and aircraft is stopped.

If side wind is present, it is necessary to set in the proper cross trail, which is done by turning knob 143 to match the drift angle indicated at 144. This will displace the optics slightly (angle F), and therefore it is necessary to readjust the same by turning knob 114 and at the same time to readjust the course through substantially the same angle. Therefore switch 124 is closed at the time knob 114 is adjusted, so that the course is also changed through the proper offset angle.

When bombing at low altitude, the knob 28 is pushed in a direction to expose scales 29' and 30' while, when bombing at high altitude, it is pushed in the opposite direction to expose scales 29 and 30. This adjustment will change the ratios within the machine, as explained, so that the bomb is released in each case at the proper time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a combined bomb sight and automatic pilot for aircraft, an optical system, a single directional gyroscope for both stabilizing said optical system in azimuth and controlling the heading of the aircraft, a follow-up device at said gyroscope, a connection from said device to turn said optical system, a transmitter driven from said follow-up system, a visual pilot director, a repeater motor normally actuated from said transmitter for turning said pilot director, a rudder servomotor for controlling the heading of the aircraft, and means for transferring the output of said transmitter to control said rudder servomotor.

2. In a combined bomb sight and automatic pilot for aircraft, a displacement control member, means actuated by said displacement control member for causing displacement of the line of sight of the bomb sight through any desired angle, means actuated by said displacement control member for causing the aircraft to turn through a corresponding angle, a rate control member, and means actuated by said rate control member for causing said two first-named means to turn said line of sight at a selected rate and to turn said aircraft at a faster rate.

3. In a combined sight and automatic pilot for aircraft, a displacement control member, means actuated by said displacement control member for displacing the line of sight of said bomb sight through any desired angle, means actuated by said displacement control member for causing the aircraft to turn through a corresponding angle, a rate control member, means responsive to said rate control member for setting up a predetermined rate of turn of said line of sight and of the aircraft, and means responsive to movement of said rate control member from its neutral position for preventing operation of said displacement control member.

4. In a combined bomb sight and automatic pilot for aircraft, a manually adjustable variable speed drive having an output member for setting up respectively a rate of turn of the sight and a proportionate rate of turn of the aircraft for target tracking purposes, variable ratio gear means driven from the output member and coupled with the automatic pilot for controlling the turning of the aircraft, a clutch for changing the ratio of the gear means operable by the adjustment of the variable speed drive to zero output rate, and manual means thereupon effective for displacing directly the output member of the variable speed drive to turn the sight and aircraft for searching purposes, at a proportionate rate differing from the proportion effective during tracking.

5. In a combined bomb sight and automatic pilot for aircraft, the combination with an optical system rotatable in azimuth on an aircraft of a manually displaceable member for rotating directly said system to position the sight on a target and causing at the same time the turning of the aircraft through said automatic pilot, means for thereafter tracking the target comprising a variable speed drive having a manual control member and an output member operatively connected with the sight and with the automatic pilot so as to cause the sight and aircraft to turn at rates varying in accordance with the setting of the manual control member, interlock means operated by the manual control member on its initial displacement from a zero output rate position for disabling the manually displaceable member, and further means operated by the manual control member on said initial displacement for changing the relative rates at which the sight and aircraft are turned.

6. In a combined bomb sight and automatic pilot for a dirigible craft, a variable speed drive having a control member and an output member, a line of sight defining instrument on the craft, a directional reference, separate means driven by the output member for turning the instrument and also the craft with respect to the directional reference at either of two different relative rates, said means including a two speed shiftable gear mechanism connecting the automatic pilot with the output member for controlling the turning of the craft, means for shifting said gear mechanism in one sense actuated by the control member on being displaced to its zero output rate position for selecting a predetermined one of the relative rates, a manually operable displacement knob effective when the control member is thus displaced to turn directly the output member of the variable speed drive to turn the craft and also to position initially the instrument so that the line of sight is on the target, means controlled by the control member on movement away from its zero output rate position for shifting the gear mechanism in another sense to select the other of the relative rates, the control member being then used to so adjust the variable speed drive as to keep the line of sight on the target.

HOWARD C. VAN AUKEN.
FREDERICK N. ESHER.